US009264447B2

(12) United States Patent
Geigel

(10) Patent No.: US 9,264,447 B2
(45) Date of Patent: Feb. 16, 2016

(54) SIMULTANEOUS DETERMINATION OF A MOBILE DEVICE AND ITS USER IDENTIFICATION

(71) Applicant: Arturo Geigel, Bayamón, PR (US)

(72) Inventor: Arturo Geigel, Bayamón, PR (US)

(*) Notice: Subject to any disclaimer, the term of this patent is extended or adjusted under 35 U.S.C. 154(b) by 34 days.

(21) Appl. No.: 14/310,009

(22) Filed: Jun. 20, 2014

(65) Prior Publication Data

US 2015/0163240 A1    Jun. 11, 2015

Related U.S. Application Data

(63) Continuation-in-part of application No. 13/243,913, filed on Sep. 22, 2011, now Pat. No. 8,769,688.

(51) Int. Cl.

| G06F 11/00 | (2006.01) |
|---|---|
| H04L 29/06 | (2006.01) |
| H04W 12/08 | (2009.01) |
| H04W 4/02 | (2009.01) |
| G06F 11/30 | (2006.01) |
| G06F 21/55 | (2013.01) |
| H04W 12/12 | (2009.01) |

(52) U.S. Cl.
CPC ........ *H04L 63/1441* (2013.01); *G06F 11/3006* (2013.01); *G06F 11/3058* (2013.01); *G06F 21/552* (2013.01); *H04L 63/1408* (2013.01); *H04W 4/02* (2013.01); *H04W 12/08* (2013.01); *H04W 12/12* (2013.01); *G06F 2221/2111* (2013.01)

(58) Field of Classification Search
CPC ............ H04L 63/1441; H04L 63/1408; G06F 11/3006; G06F 21/552; H04W 4/02; H04W 12/08; H04W 12/12
See application file for complete search history.

(56) References Cited

U.S. PATENT DOCUMENTS

| 2005/0140783 | A1* | 6/2005 | Akamatsu | H04N 7/20 348/143 |
|---|---|---|---|---|
| 2006/0281473 | A1* | 12/2006 | Debany | G01S 5/14 455/456.2 |
| 2007/0039030 | A1* | 2/2007 | Romanowich | G08B 13/19608 725/105 |
| 2009/0143913 | A1* | 6/2009 | Kim | B25J 9/1674 700/259 |
| 2010/0053330 | A1* | 3/2010 | Hellickson | G01S 17/023 348/153 |
| 2010/0321463 | A1* | 12/2010 | Weinstein | H04N 5/76 348/14.01 |
| 2011/0025846 | A1* | 2/2011 | Garrett | H04N 7/18 348/143 |
| 2011/0046920 | A1* | 2/2011 | Amis | G01S 19/16 702/181 |
| 2011/0128346 | A1* | 6/2011 | Pham | H04N 7/185 348/14.07 |
| 2011/0187864 | A1* | 8/2011 | Snider | H04N 7/18 348/158 |
| 2012/0019659 | A1* | 1/2012 | Warzelhan | H04N 7/18 348/143 |

* cited by examiner

*Primary Examiner* — Techane Gergiso
(74) *Attorney, Agent, or Firm* — Eugenio Torres; Victor Rodriguez; Ferraiuoli LLC

(57) ABSTRACT

An apparatus including an intrusion detection arrangement and a location identification arrangement which ties digital information (i.e. transaction events such as exact parameters of information, database queries, transaction ranges, etc.) submitted to a computer system with the physical characteristics of the event such as the area and/or picture of the person(s) submitting the information.

11 Claims, 14 Drawing Sheets

| Computer name | Property Number | MAC Address | IP Address | Name of User | Index | Computer type (wired /wireless) |
|---|---|---|---|---|---|---|
|  |  |  |  |  |  |  |

FIG. 4

| Index | Computer Name | Property Number | MAC Address | IP Address | Name of User | Grid ID |
|---|---|---|---|---|---|---|
|  |  |  |  |  |  |  |

FIG. 5A

| Index | Grid ID | Average Signal Strength captured by AP 1 | Average Signal Strength captured by AP 2 | Average Signal Strength captured by AP 3 |
|---|---|---|---|---|
|  |  |  |  |  |

FIG. 5B

SIMULTANEOUS DETERMINATION OF A MOBILE DEVICE AND ITS USER IDENTIFICATION

RELATED APPLICATIONS

This application is a Continuation in Part of U.S. patent application Ser. No. 13/243,913 filed on Sep. 22, 2011.

STATEMENT REGARDING FEDERALLY SPONSORED RESEARCH AND DEVELOPMENT

N/A

BACKGROUND OF THE INVENTION

1. Field of the Invention

The present invention relates generally to the field of security measures, more particularly to a network surveillance or computer intrusion detection system or extrusion detection wherein digital information is tied to physical characteristics of the event.

2. Discussion of the Background

Networks administrators are continuously searching for security measures in order to avoid intruders from gaining unauthorized access to resources of the networks. A tendency of the intruders, also considered as attackers, is to position a wireless device in proximity of a wireless network to attempt to hack the wireless network in order to gain access to an internal network, or to gain free Internet access.

Further, some computer environments require more security than others. For example a bank, Government institution, etc. needs to monitor computer systems for irregularities in the transactions that take place in their networks. In addition they need to maintain a perimeter under which confidential transactions need to take place and be monitored. This is especially true for transactions generated by trusted users in a trusted computer system. Since trusted users have privileges that are not normally accessible to a normal user or even a computer intruder which would need the privileges of a trusted user to add, alter or delete data. To maintain order the administrators of the system need to have numerous security measures to deter or in the event of an incident to react or collect information about the privileged information event.

FIG. 1 shows a relevant art U.S. Pat. No. 5,557,742, incorporated herein as reference, disclosing an intrusion detection system (IDS). The intrusion detection system is limited to detecting the elements within the network and identifying the target system that originated the intrusion. This concept of intrusion detection is limited since there is no data that links the device to a user and physical area.

Therefore, in the field of security measures several procedures for detection are considered in order to avoid intruders to achieve their goal without punishment of being properly identified during their illegal action. For example, some security measures used are computer surveillance, which generally comprises an intrusion detection system and physical location of computer system, with a camera surveillance which generally comprises camera systems and method for controlling servos.

Several public documents related to the use camera surveillance incorporate motorized cameras, position encoding device that can be applied to servos moving tile camera, optical encoders, motor controller with integrated circuit and method of controlling a motor, system for moving the camera to the desired location for surveillance for robotic. For example see U.S. Pat. No. 6,830,388, U.S. Pat. No. 4,074, 179, U.S. Pat. No. 4,491,776, U.S. Pat. No. 4,540,925, U.S. Pat. No. 4,319,134, U.S. Pat. No. 4,899,048, U.S. Pat. No. 6,081,091, U.S. Pat. No. 4,876,494, U.S. Pat. No. 4,925,312 and U.S. Pat. No. 6,882,901.

Further, for computer surveillance several methods for wireless signal location have been proposed. For example see U.S. patent application 2003/0232598, U.S. patent application 2006/0281473 and U.S. Pat. No. 7,570,213.

The shortcomings of U.S. patent application US 2006/0281473 is that it does not deal with the specific method of determining the location of the signal on the instance where the location contains obstacles that may influence the readings in the signal strength which may give a false identification of the signal location. It does not take into account the signals fluctuations during the spurious events which may alter the signal strength such as changes in the physical configuration of an office. In other words, it assumes a static and unchanging terrain of measurements that does not have obstacles.

U.S. patent application US 2003/0232598 is directed to the limitations in (receive signal strength indicator) RSSI measurements where there are "ambiguities and compensations for gain variations with frequency". This is a shortcoming in which most environments must deal with ambiguities and where there is no way to alter devices which do not belong to the administrator of an environment to compensate for the gain variations. Also one of said application discloses that it is not necessary to determine absolute location or distance.

U.S. Pat. No. 7,570,213 tries to overcome these limitations by the addition of a clustering algorithm to compensate for the fluctuations in the Signal strength. This again falls short due to the clustering algorithm itself which bases its discriminative power in a distance measure to cluster signals together. Sudden changes in signal strength profile such as walking behind a wall or column or changes in the environment may yield false positives that are not caught by the clustering algorithm.

Further, as mentioned, computer surveillance and camera surveillance tie the computer incident to the computer terminal from which the transaction originated and the person making the transaction. Such determination is necessary to trace the action to the user. A prior art that ties the computer incident to cameras is U.S. patent application 2009/0125981.

U.S. patent application 2009/0125981 has several shortcomings. The first shortcoming is that while it mentions that it supports wired communications the specification does not provide means in the narrative to support the location of wired devices. Another shortcoming is that the arrangement may pull a camera image with a notice which indicates that a potential network intrusion has been detected and security personnel may then manually move a camera. The current statement limits the system because security personnel must be available to move the camera and the system does not do the whole operation of zooming to a specific target. Said limitation is based on the method of detection of the signal which as stated in where the detection device is charged with identifying the general physical location.

Accordingly, there is a need in the art for a method to accurate identify the intruder and/or computer physical location.

SUMMARY OF THE INVENTION

The inventions objective is to tie digital information (i.e. transaction events such as exact parameters of information, database queries, transaction ranges, etc.) submitted to a computer system with the physical characteristics of the event such as the picture person(s) submitting the information. The typical embodiment can be divided into several components to make its entirety:

Network surveillance, computer intrusion detection system or extrusion detection which basically refers to a method for detecting computer events and the capacity to analyze the same.

A method for locating physically the computers (desktop, laptops, PDA's, etc) such as the RSSI of a wireless signal or the means of detecting location such as time of signal travel. These marks that belong to a network and relay the information wireless several points in the delineated physical environment so that specific coordinates can be derived. Said coordinates will be stored in the intrusion detection system.

A calibration mapping system that stores the signal to locate information in a storage system. Further the system stores static information of static computer system such as servers and other computing systems as well as obstacles, such as walls and columns.

A Supervised learning algorithm that learns expectations to average reading in the calibration mapping system and covers examples of extreme variations which the environment may provide.

A camera surveillance system to take the picture of the computer triggering the rules in the intrusion detection system and the person or object at said terminal.

A servo system to move the cameras to the desired coordinates stored in the intrusion detection system.

A system to translate the desired coordinates to move the servo system to the desired coordinates.

An image processing system wherein any input image, such as a photograph or video frame, is compared with an image in storage of the grid location. Using image processing techniques it compares both images to see if a change in the scenery has occurred.

Another aspect of the preferred embodiment is to provide at least two different processes to achieve the computer location and intruder identification. These two processes are divided as follows:

Process for stationary terminals (desktop computers)
Process for non-stationary terminals (laptops, Notebooks, tablet PC's, PDA's)

The main difference between the two processes is the coordinate determination within the physical boundaries of the network. The stationary terminals process carries the coordinate investigation prior to their activation on the network. The non-stationary terminals process needs to determine the physical coordinates of the moving terminal in "real time".

One aspect of the preferred embodiment is to provide a wireless intrusion detection arrangement and a location identification arrangement, wherein the intrusion detection arrangement determines when an intruder, without authorization, attempts to access a wireless network of which the intrusion detection arrangement is a part. The location identification arrangement identifies at least a first approximate physical location of the intruder when the attacker attempts to access the wireless network. The location identification arrangement is configured to communicate the first approximate physical location to a surveillance arrangement which monitors the first approximate physical location. The images are processed to identify the "real time" physical location of intruder.

The invention itself, both as to its configuration and its mode of operation will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more than one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The following drawings should be read with reference to the detailed description. Like numbers refer to like elements. The drawings, which are not necessarily to scale, illustratively depict embodiments of the present invention and are not intended to limit the scope of the invention.

FIG. 4 show arrangement of database in the intrusion detection system.

FIGS. 5A through 5B shows relevant information related to the intrusion detection system.

DESCRIPTION OF THE PREFERRED EMBODIMENT

Figure 2:
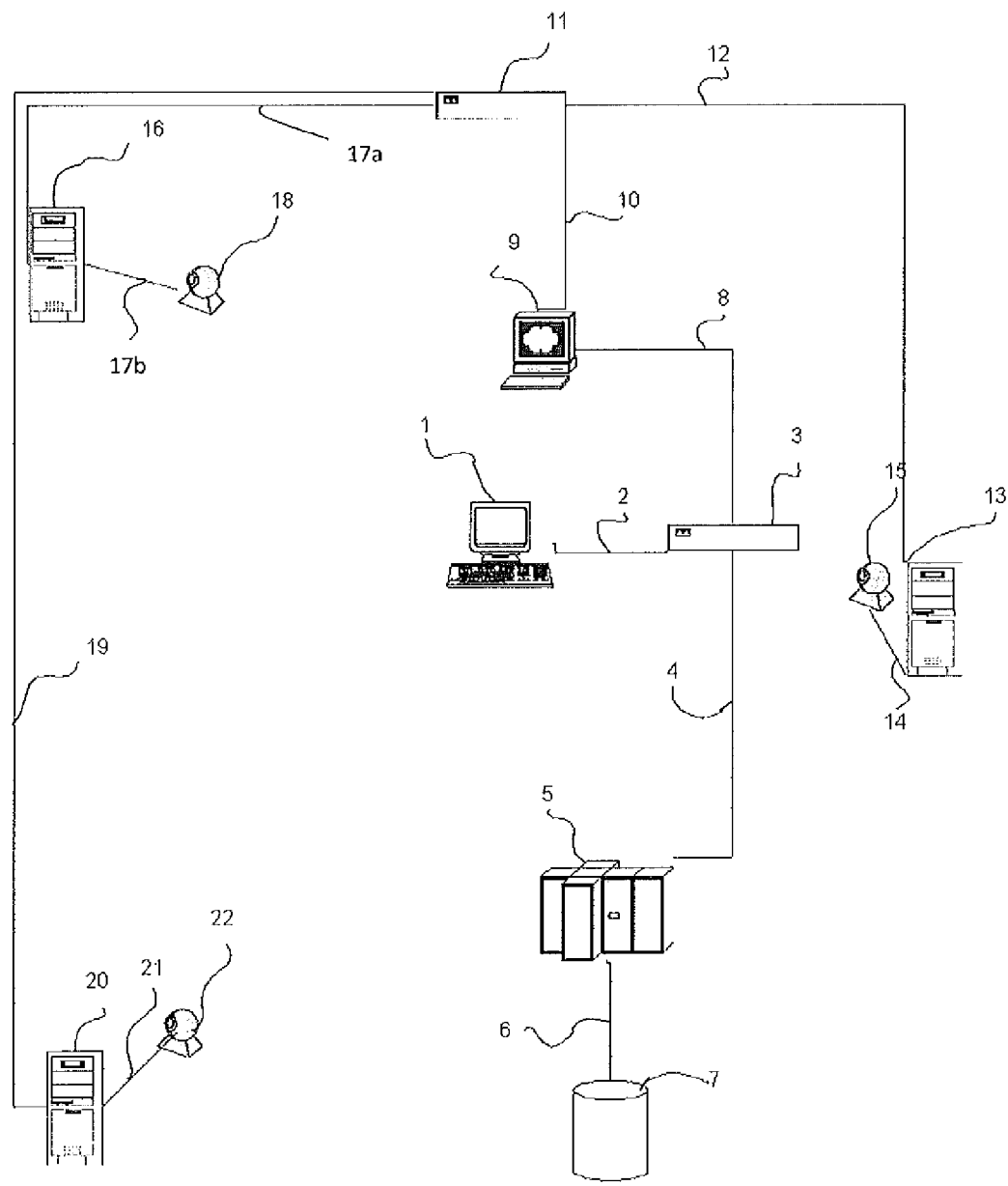
FIG. 2 show physical connection between stationary terminals.

FIG. 2 discloses the first embodiment which relates to a physically stationary terminal in the computer network. The stationary terminal comprises a intrusion detection device 1, switch 3, 11, computer system 9, user input device 13, 16, 20, server 5, database 7, image collectors, such as cameras 18, 15, 22 and electrical connections, such as electric wires 2, 4, 6, 8, 10, 12, 14, 15, 17, 19, 21.

Figure 3:
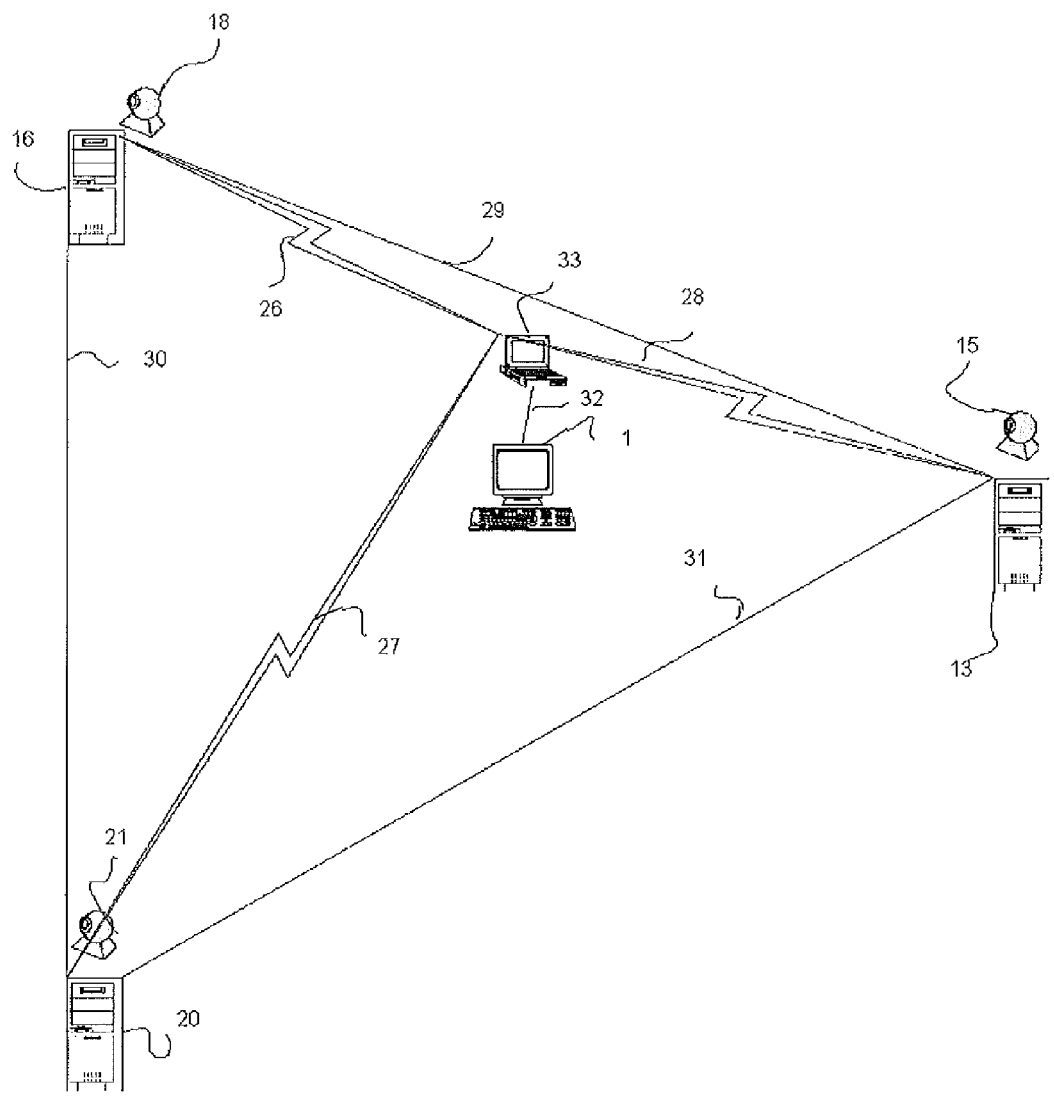
FIG. 3 shows three access points (trilateration) used to determine the location of the stationary device.

FIG. 3 discloses the second embodiment which relates to a wireless non-stationary terminal in the computer network. The non-stationary terminal comprising a security device 1, switch 3, 11, pining server 33, providing wireless signal 26, 27, 28, user input device 13, 16, 20, image collectors, such as cameras, 18, 15, 22 and electrical connections, such as electric wires 29, 30, 31, 32.

1. Preliminary Steps

Figure 12:
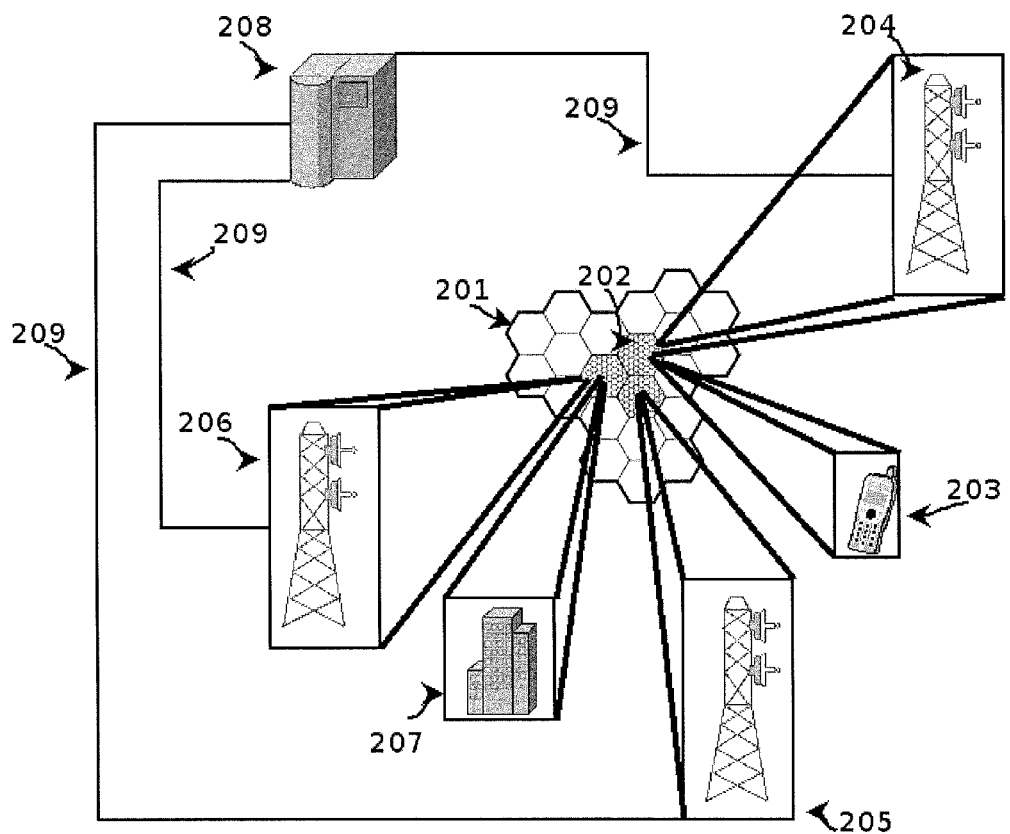
FIG. 12 shows a layout of multiple communication cells containing cellular antennas, cell phone and business building.

The preliminary work is training the area or system in which a calibration mapping system or a digital map and a signal strength model of the local area to the network is defined, for example as shown in FIG. 2, FIG. 3 and FIG. 12. In the preferred embodiments, stationary and non-stationary terminals, the training is done within a delimited locale defined in the calibration mapping which has a set of access points (APs) that can comprise the wireless network (ex. IEEE 802.11 or "Bluetooth") in the delimited locale or a physical user input device. The delimited locale does not imply small coverage area but just what is predefined to fall within the boundaries of the system. The APs are segregated from the regular network for security purposes and will manage only the communications for the preferred first and second embodiment location functions. An alternate set of APs will provide communication for non-stationary devices. The access points that manage the location function, according to their location, will divide the area into spaces and stored in the calibration mapping. Other extraneous elements such as obstacles can be stored on the calibration mapping. The calibration mapping will be carried out sampling the signal at each of the grid points defined in the calibration map and stored in a database with fields such as those shown in FIG. 4 through FIG. 5B. For example the fields used for the storage of data are selected from Computer name, Property number, Media Access Control (MAC) address, Internet Protocol (IP) address, name of user, Index, Computer type, Grid ID and more. Alternate scenarios can be carried out by demonstrating physical changes to the environment and tagging such exceptions that a supervised learning algorithm such as a supervised neural network or other supervised learning algorithm can discriminate the different scenarios shown in the training set.

The process of using a supervised algorithm to discriminate physical changes consists of training the algorithm to handle exceptions, such as the redistribution of movable elements, within the confined space that is being monitored. The movable objects comprise, for example, office movable walls which may absorb signal strength. The discriminate physical changes information is entered by sampling different configuration of embodiments and storing it in the database and training a supervised learning algorithm to discriminate the conditions of the signal strength under changing condition of the environment.

An additional step is to store a picture of the grid location such that it serves as the baseline for the imaging processing algorithm.

Figure 6A:
FIGS. 6A and 6B show flow chart of the actual detection process.
Figure 6B:
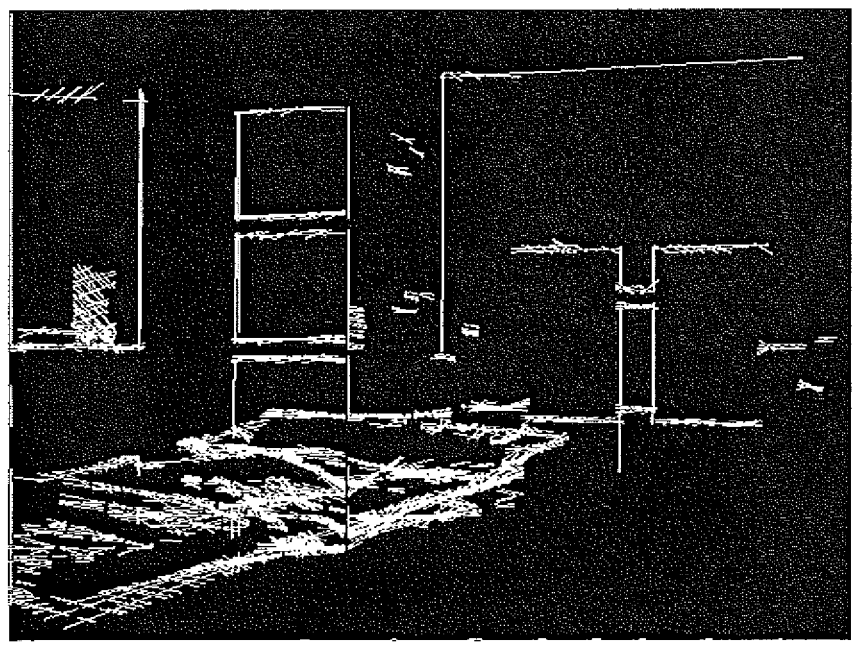

A possible embodiment that demonstrates the image processing algorithm is that based on the assumption of the scene that is captured an efficient image processing algorithm can be implemented. For example, most indoor spaces comprise linear boundaries. This information can be used to exploit an efficient image processing to encode the scenery and the changes to the scenery. Indoor scenery is shown in FIG. 6A. The figure shows that most elements are of linear nature. An efficient algorithm to represent such scenery is the Hough transform. The Hough transform is represented in FIG. 6B. The objective of Hough transform, in this instance, is to identify the line segments that are in the image.

Figure 7:
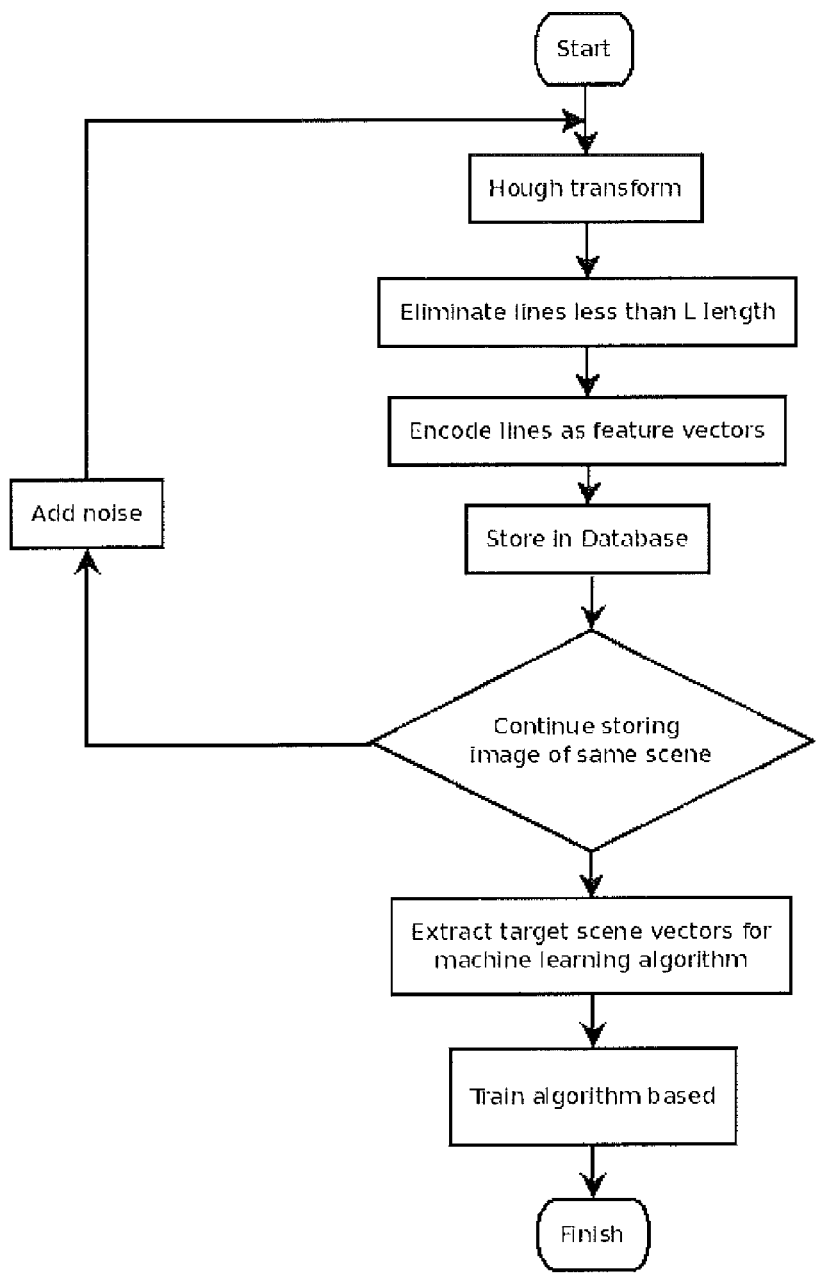
FIG. 7 shows a process of using the Hough transform for possible embodiment.

The process of using the Hough transform for possible embodiment is shown in FIG. 7. The algorithm start by taking the Hough transform of the image. The next step is to extract the size of the lines in pixels and do the ratio of the size of the line to the total size of the image. If the lines are below certain threshold the line is eliminated. This eliminates possible background noise. The lines are encoded as features vectors by using the start and endpoints of the lines. The line pixels are stored in order from left to right and top to bottom to maintain order of position in the image. The feature vectors will also include tag in the vector in which a possible embodiment is the label of changed and not changed. Another embodiment may be more granular as changed with the addition of a column, wall, etc. Both, the image and the feature vector are stored in the database. The image scenery can then be resampled with the addition of noise in the form of additional element added to the scenes (movable walls, movable columns, to add the desired noise (this noise implies changes to the environment and are distinguished from line noise which are lines that are not important and may confuse the supervised algorithm with unnecessary details of the scenery) to the image. Once the necessary images are taken and stored in the database, then the next stage of the process takes place which is the extraction of all relevant feature vectors for the scene are extracted from the database to the train the supervised learning algorithm. Possible embodiment for the supervised learning algorithm is a neutral network with two output nodes that classify the scenery as changed and not changed. The supervised learning algorithm is the trained with the data and then the supervised algorithm can then be used to detect future changes to the scenery.

Delimitation of Boundaries.

Figure 8:
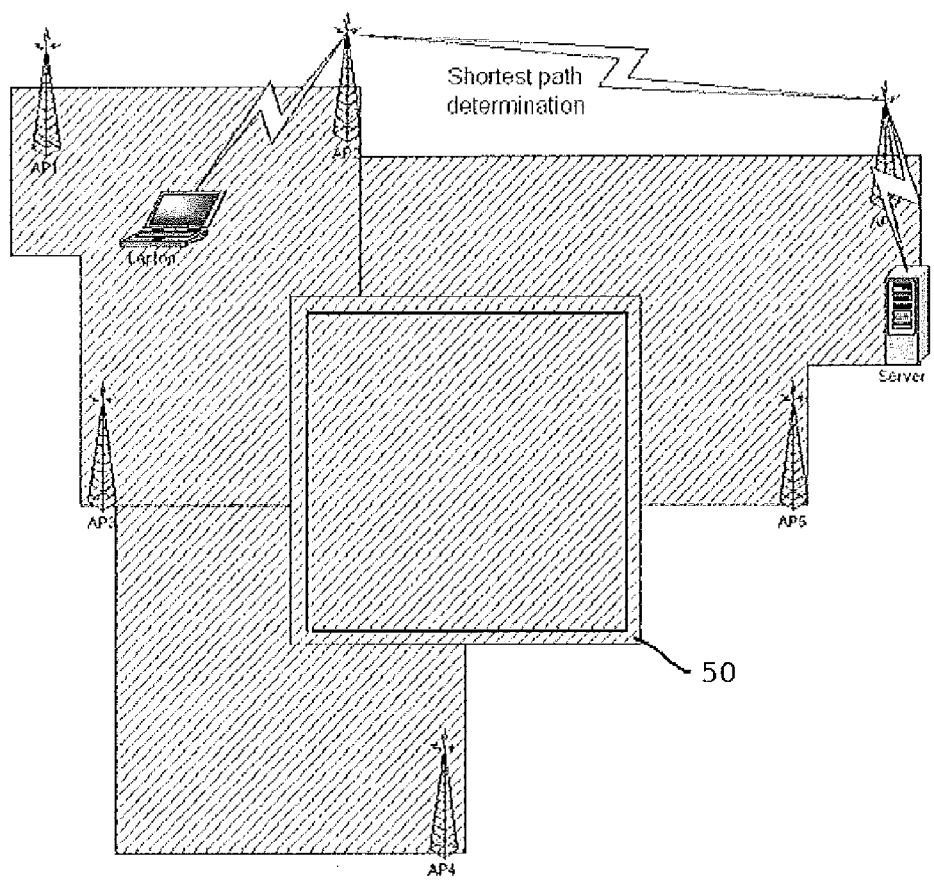
FIG. 8 shows an example for non-stationary terminal detection in accordance with the principles of the present invention.

Special sampling of the space is also done at the boundaries of the desired area as depicted in FIG. 8 in the delimitation area 50. Delimitation area 50 marks the boundary of the desired confinement sector where the computer system should reside. Said delimitation area 50 can also mark internal boundaries as well as external boundaries of the space. If the user is detected at the boundary of area of the grid the signal may be terminated or special warning to the system may be issued.

2. Physical Determination of the Stationary Terminal

The physical determination of the stationary terminal will consist of connecting a wireless enabled device which is connected to the stationary device (assumed to be a non-wireless device which is connected to a wired network. If it is wireless enabled it does not need the connected wireless enabled device) as in FIG. 2. Once the device is connected the wireless device will communicate with the intrusion detection system and enter the relevant information as depicted in FIG. 3. The information will go into a database in the intrusion detection system as seen in FIG. 4. Once the information is stored, the system will sample the signals to determine the physical location of the stationary device. The information from the sampling signal is stored alongside the previously collected information as seen in FIG. 4.

The location will be determined as a function of received signal strength values gathered from the communications between the wireless device attached to the stationary device and the APs. With a minimum of three access points trilateration can be used to determine the location of the stationary device within the respective delineated space as shown in FIG. 3. If the area of coverage is substantial and the devices have a high time resolution, an alternate embodiment to measure signal strength can be used which consists of positioning servers at the same position as the access points. Instead of measuring signal strength the alternate embodiment would be to send a "ping command" from a server located at the same position as the access point to determine the time response from the stationary device to the server that controls the access point. At the same time determine the speed at which the signal traveled can be computed by $$v=\lambda f$$

Where the v is the velocity, lambda is wavelength and f is the frequency. From the velocity and time the distance from the "pining" server to the stationary device can be determined. The same information will be stored in the same fashion as the main embodiment as shown in FIG. 4 through 5B.

3. Network Detection Setup

Figure 1:
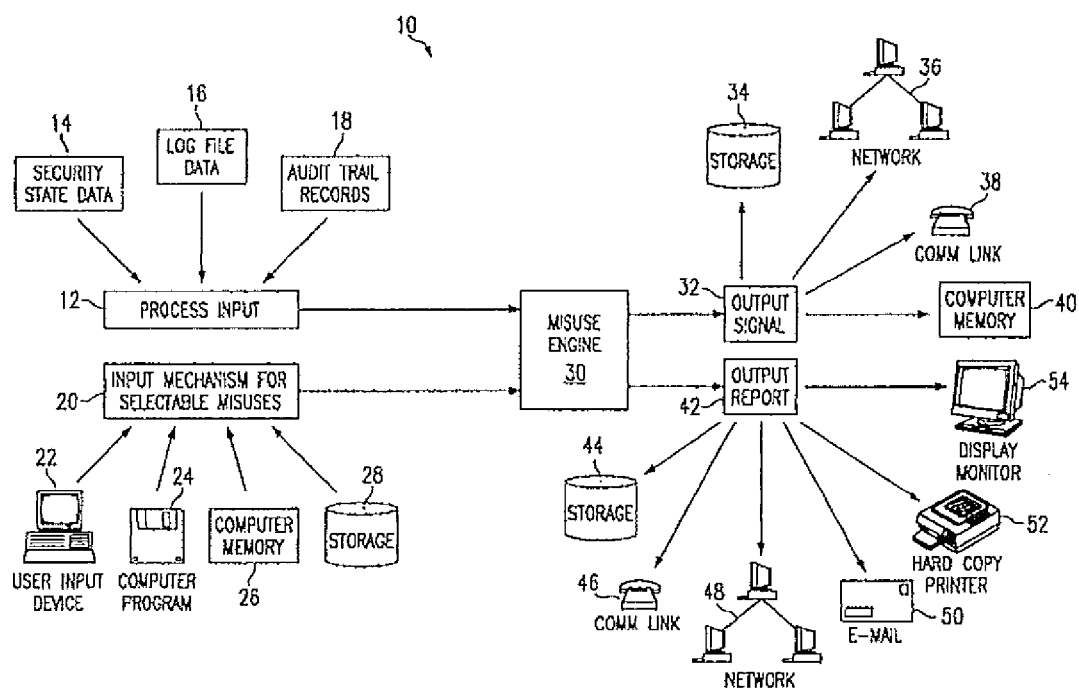
FIG. 1 shows an intrusion detection system (IDS) as described in the prior art U.S. Pat. No. 5,557,742.
Figure 9:
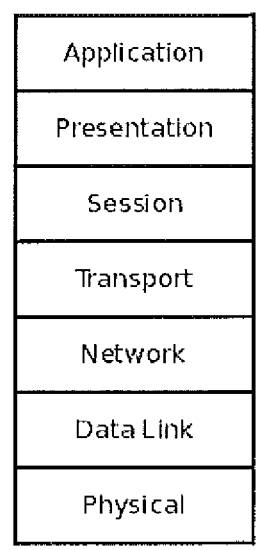
FIG. 9 shows a diagram of application data, layer 7 of the OSI reference, which the intrusion detection system may be capable of analyzing, in accordance with principles of the present invention.

An intrusion detection system, as mentioned in FIG. 1 of U.S. Pat. No. 5,557,742 incorporated herein by reference, is limited to detect elements within the network. The intrusion detection in the present embodiment comprises an additional database that contains the additional information pertaining to the individual stationary computers as well as their physical location within the Local area network. Additionally the intrusion detection system in the preferred embodiment will be capable of analyzing application data (Layer 7 of the OSI reference FIG. 9). An example of the preferred embodiment would be rule based IDS or behavioral IDS which is configurable to examine the payload (data) of the network traffic as it flows through the network. Another example would be host intrusion detection configured to send email alerts to a modified Network intrusion detection (NIDS) engine that passes the incoming data describing file changes. The preferred embodiment such as rule based NIDS can be configured on the basis of predefined rules. Such rules could be Database (containing for example threshold rules to access information in an accounting database) access rules described at the data layer in hexadecimal code. Other examples of rules would be access to different computer resources on the network or host based intrusion detection programs sending the information to a centralized network intrusion detection system.

Figure 10:
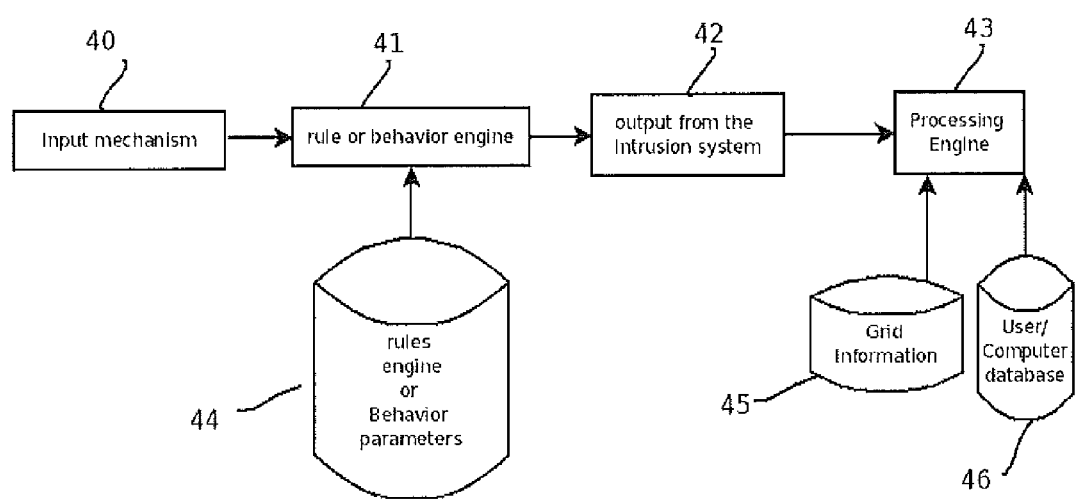
FIG. 10 shows an intrusion detection system comprising an input mechanism in accordance with the principles of the present invention.
Figure 11:
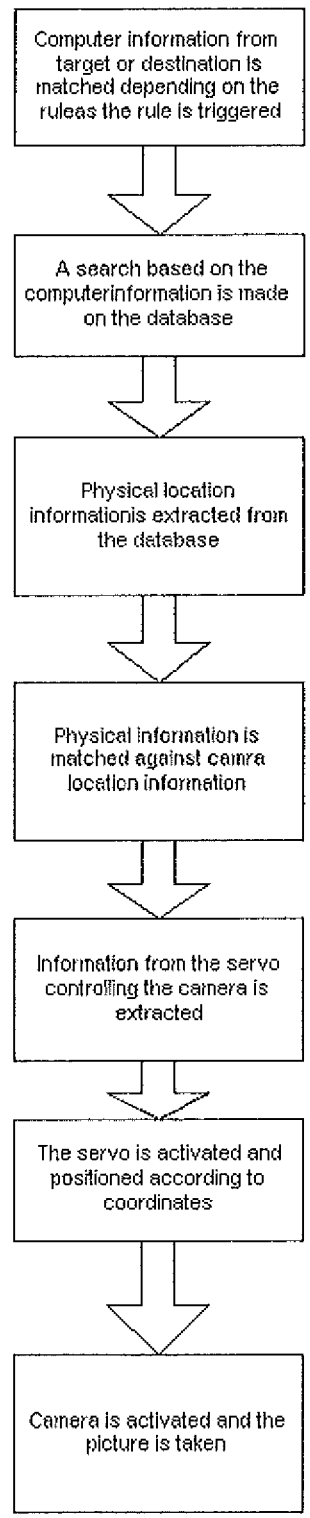
FIG. 11 shows tracking of a non-stationary source as the target for location.

The preferred embodiment is shown in FIG. 10. The FIG. 10 shows an IDS comprising an input mechanism 40. The input mechanism 40 can be a sniffer that is connected to the network and intercepts all traffic in the assigned network area. The desired positioning of the intrusion detection device should be located, as shown in FIG. 2, in the middle of the communication stream of the target system being compromised 5 and the originator of the attack (any user input device 13, 16, 20). The input signal is sent to a processing engine such as behavioral or rule engine 41 where the intercepted traffic is classified as either suspicious or not suspicious. The output of the IDS 42 is sent to a processing engine 43 the based on the IP information that it receives matches the information database 46 that includes the table depicted in FIG. 4 through FIG. 5B. The information stored at the database 46 related to table disclosed in FIG. 4 tells the system which user is accountable for the specified system that is in the alert. The alert collected by the input mechanism 40 comprises information such as IP address and MAC address which are used in the query match to the database. This information is also sent to the access point or LAN router where information is fetched from the telecommunications device to determine the location of the system.

4. Detection Process

The determination of the location is carried out depending on whether it is a wired line or wireless communication. The wired computer system is defined using computer type field of table contained in FIG. 4. The information is fetched from the table database 46 of FIG. 5 and passed to the processing engine 43. The engine will then query database 46 for the table shown in FIG. 5A that depicts the static information of the wired computer. The grid information trustworthiness relies on the proper system configuration of the switching elements in which the computer is connected. Such switching element 3 in FIG. 4 must not allow the user to be able to connect the computer cable to other physical switching drop locations.

For wireless system, the computer is identified using the computer type field of the table contained in FIG. 4. The information is fetched from the table in database 46 of FIG. 4 and passed to the processing engine 43. The processing engine already has the wireless identification means through the IP information and the MAC address of the computer system. The system will query signal strength of such device from access points 13, 16, 20 from FIG. 3. The access point will relay this information to the processing engine 43. The access points will relay this information to the processing engine 43 which resides in the computer system 9 of FIG. 2. The system will then determine the location of the system by sampling consecutively from the three access points. The strength of the system will then be average and compared to the grid reading stored in the database 45 which stores the table shown in FIG. 5B. A measure of closeness will then determine the best match. Additionally the information will then be passed to the supervised learning algorithm which will then use the input information plus the information of its training to determine the grid location. Both the measure of closeness and the output of the algorithm will be used to determine the final grid location on which the system resides.

An alternate embodiment comprises on sending a Ping command from the access points to determine the time signal took to get from the source machine to the destination machine and back. This process is then average and the time can then be compared to the mean times stored in the database and then use trilateration to obtain the physical location of the signal. If the processing engine is pre configured to enforce boundary limitations (person is inside the grid) it will pull the access points periodically at a specified interval for all registered IPs in the system (for example the DHCP client data base that holds all active IP's in the network).

5. Interface with Servo Controller and Camera

The physical location is matched against the closest camera(s) based on the physical location of the target and the camera list. Based on the location, camera type, lenses and other relevant information the system may need to adjust camera angles via a servo mechanism. If there is a servo for camera positioning the preferred embodiment would fetch the camera servos based on the camera that was chosen from the camera list. The preferred embodiment would then adjust the camera servo such that the camera's field of vision is directed to the coordinates of the stationary device, Once the camera's field of vision is directed at the physical coordinates of the stationary device the picture is taken.

6. Image Processing to Corroborate that the Equipment is Choosing the Right Coordinates.

Due to the possibility that if an object is distorting the signal and a different grid detects the same signal strength the system can do an inverse calibration step. In the forward step the calibration is made by taking signal samples at one specific point of the grid map. The training algorithm will be trained in case of noise. But this does not preclude the possibility of the grid location being modified by placing temporary walls (such as office spaces with cubicles) which may modify the signal strength. The inverse calibration step consists of an image calibration of the location where a calibration picture is compared to the original stored image of the location. Both images may be threshold. This will create regions that may be tagged and then compared against the baseline picture. An additional step may be used by applying an edge detection technique and then use an algorithm such as the transform to detect the boundaries of newly places walls or other significant obstacle that may distort the signal. The equipment will then store the information and signal a significant modification to the locations so that new samples of the signal may not be taken to recalibrate the system. This new calibration may then be added to the learning algorithm so that it adjusts to the new parameters.

Alternate Embodiment

The alternate embodiment consists of having a non stationary source as the target for location. When the rule is triggered from the intrusion detection system the system will fetch the computer information and will start sensing the network for the location of the non stationary device. This is done in real time since the target is moving along the delineated spaces. In order to track the non stationary in a big local area network (such as a building) the delineated space may take the form of localized spaces such as room x with N amount of access points as shown in FIG. 8. To locate the non-stationary device in a designated localized space the system may sample all signal strength's from the devices. Alternatively the embodiment may use a "trace route" or similar process to help localize the non stationary device by locating the AP's which are being used as transports for the communications and therefore localizing the closest camera.

Additional Elements

The system is also capable of determining by means of tracking the location of the computer system if it falls within the predefined area of the grid. If the computing system falls outside the predefined boundaries of the grid, it can constitute as falling outside privilege boundary and may cease the communication link. This exception can be forced by the present embodiment even if it is within the boundaries of reception and transmission of the device in the perimeter. The preferred embodiments as they stand can be useful in detecting suspicious computer transactions and their originator. The preferred embodiment should not be taken as the only embodiment since the embodiment could also be complemented with biometrics, log files, etc. for additional subject information. Other means of locating computer in a closed environment like a local area network could be radio frequency identifiers. The system could also be integrated with motion sensors of conventional surveillance systems. The system could also be extended to track the user once it is acquired by the camera. Other uses would include open "hotspots" which intruders use as anonymous space to commit "digital vandalism".

Another embodiment of the present invention is the detection of intrusion wherein said intrusion is performed using a mobile device. A mobile network distributed over land areas are called cells. FIG. 12 shows a layout of multiple communication cells 201, wherein each communication cell comprises at least a mobile network distributed over land area. The communications cells 201 contains cellular antennas 204, 205, 206 a cell or mobile phone 203 positioned in a cell 202, and a business building 207. The cellular antenna 204 detects the location of the cell phone 203 in cell 202. As the cell phone moves from cell 202 to a contiguous cell, it is detected by cellular antennas in other cells. The cell phone 203 may move to a contiguous cell where there is only a cellular antenna 205 or move to a contiguous cell where there is a cellular antenna 206 and a business building 207. If the cellphone 203 moves towards cellular antenna 205 the system will remain in idle mode. As soon as the cellular phone moves to the contiguous cell where cellular antenna 206 is located it will raise an alert on the system that the cell phone is approaching building 207 located on the same cell as cellular tower 206.

Figure 13:
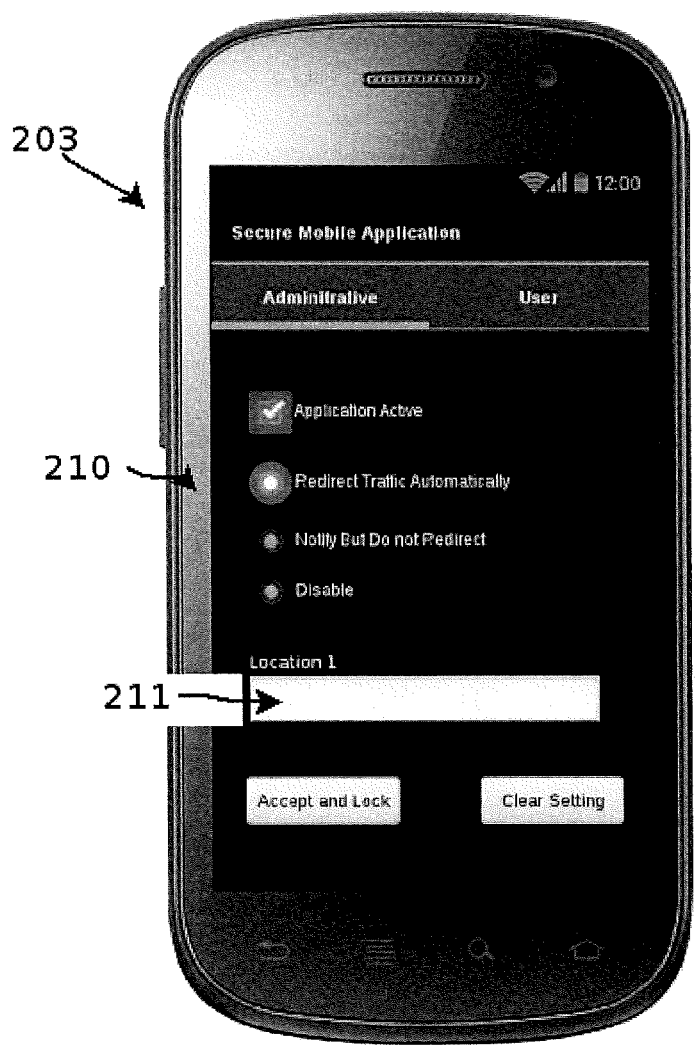
FIG. 13 shows an exemplary embodiment of an application that matches the cell phone to the identified building in order to raise an alert to the systems computer.

The intrusion detection comprises a set of intrusions or computer software or mobile application, which is stored in the mobile device or mobile phone 203, configure or arrange to complete or performed several tasks. The mobile application 210 could be downloaded from a pre-determined source (network provider server) or previously installed on the mobile device 203 by the network provider or system administrator. The application software is used to create a unique mobile identifier if needed. FIG. 13 shows one preferred embodiment of the cellphone 203 that uses an application 210 to match the cellphone 203 to the identified building 207 to raise an alert to the systems computer 208. The building 207 is tied to the cellphone 203 via said mobile application 210 that has a location identifier 211. Further in order to match the cellphone 203 with the system computer or intrusion detection device 208 information application software information, such as GPS coordinates where the cellphone 203 is located, location of the building through identifier 211, said unique mobile identification (which could be created by the application software) which was previously stored at the system computer 208 is used. Alternatively the location of the application 210 may reside on computer 208 where all the information to identify cellphone 203 with building 207 is stored. It is important to understand that the intrusion detection device stores and record data and further measures signal strength as explained above. Also at least a dynamically-oriented imaging device such as satellite images can be used to captures images of the area covered by the intrusion detection device and the antennas (i.e cells) or said areas maybe previously stored as maps at the data base. The maps include the current region structure, such as building, streets and other physical elements.

Figure 14:
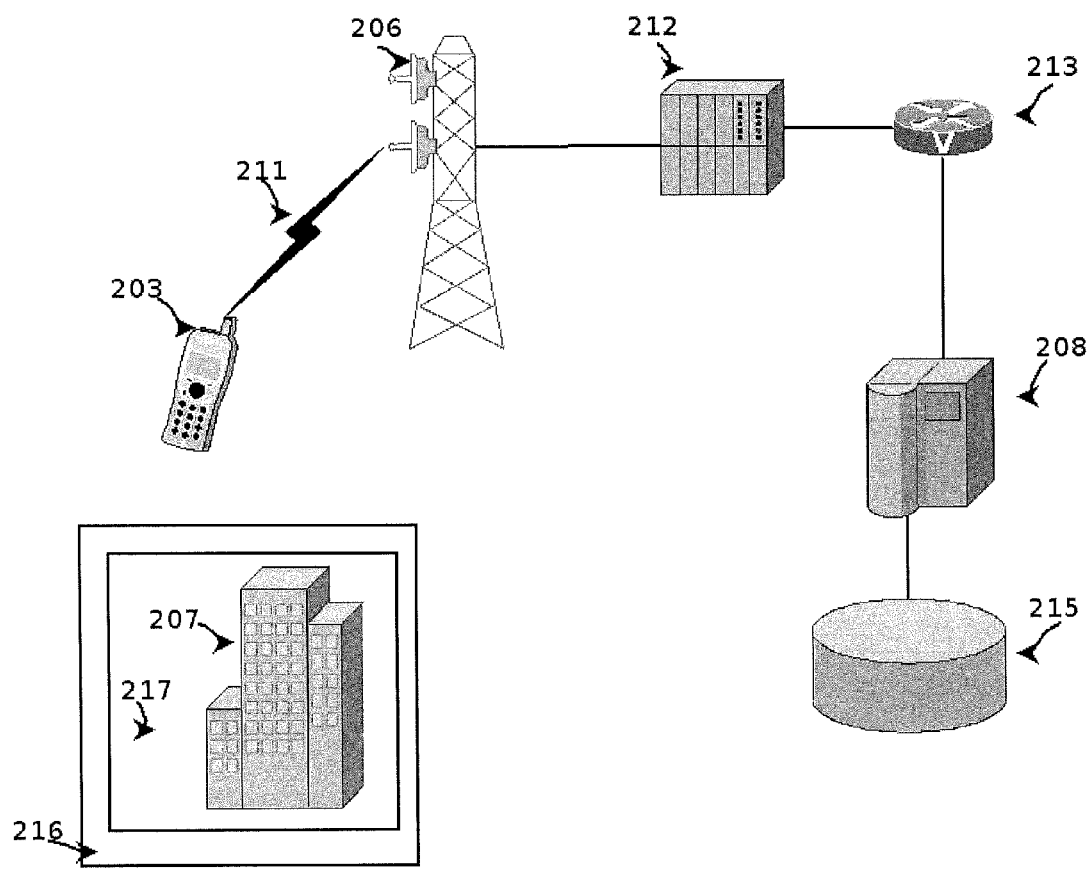
FIG. 14 shows signaling of the cellphone with cellular antenna.

FIG. 14 shows the signaling of the cellphone 203 with cellular antenna 206 through signal 211. The signal is then transmitted from the cellular antenna 206 to Wide Area Network (WAN) equipment 212. The WAN equipment 212 then sends a Transmission Control Protocol/Internet Protocol (TCP/IP) message with information from cell phone 203 that contains basic cellphone identifier and information from application 210, such as GPS coordinates where the cellphone 203 is located and location of the building through identifier 211. The information from WAN equipment 212 is sent to a router 213. The router 213 sends the information to server 208 for processing. The information from application 210 contains the location in GPS coordinates where the cellphone 203 is located and location of the building through identifier 211. The server 208 processes the information of the location identifier 211 and looks up the location identifier in database 215. The database 215 will retrieve the GPS location of location identifier 211 that corresponds to building 207. The computer 208 will then match the GPS position of the building 207 with the GPS location of cellphone 203. If the GPS location of the cellphone 203 resides in cell 202 it will drop the information. If the cellphone 203 GPS information resides in the same cell as building 207 the system will then relay a flag message to cell phone 203 to increase the frequency of communication of GPS information through the application 210. If the cell phone enters an outer perimeter 216 which corresponds to delimitation area 50. The application will then switch from a cellphone communications system to the local area network wireless communication of building 207 which can be WIFI or other local area wireless communications.

Figure 15:
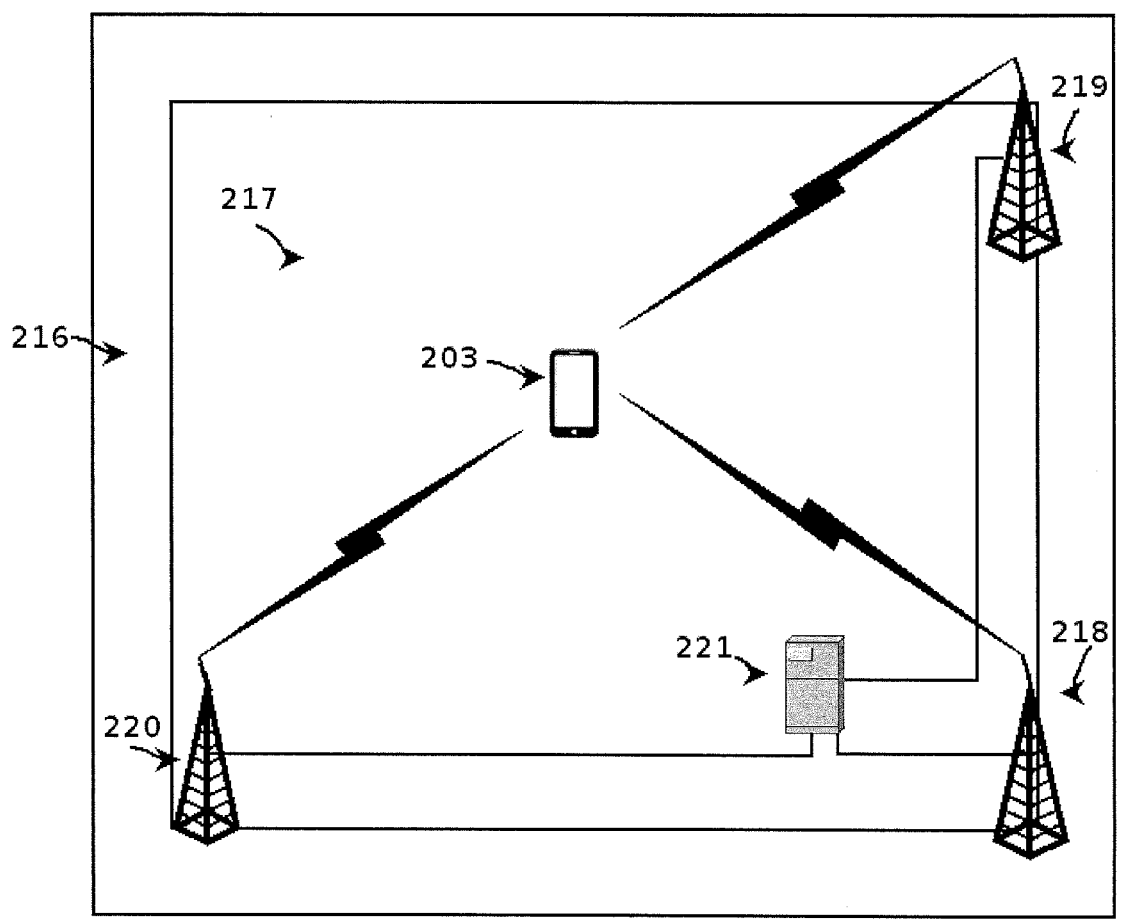
FIG. 15 shows an exemplary wireless communications infrastructure of a building.

FIG. 15 shows the wireless communications infrastructure of building 207. The Communications of the outer perimeter 216 as well as that of an inner perimeter 217 will be received by wireless antennas 218, 219, and 220. These antennas will perform triangulation and signal strength comparison, as explained above. As the cellphone 203 passes from outer perimeter 216 to an inner perimeter 217, the communications of cell phone 203 will then be filtered through intrusion detection device 221 that correspond to intrusion detection device 208.

In an alternate embodiment all the GPS location processing can be carried out in cellphone 203 instead of using computer server 208.

The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

I claim:

1. A network security system, comprising:
   an intrusion detection device configured to detect suspicious network traffic based on predefined criteria;
   an application software, wherein said application software comprises a first set of instructions including identifying global position satellite coordinates, a second set of instructions providing at least a first location identifier and a third set of instructions sending said global position coordinate and said location identifier to the intrusion detection device;
   a mobile device comprising a first data base and computing mechanism, wherein said application software is stored in the first data base and said set of instructions is performed by the computing mechanism;
   a plurality of wireless signal generators distributed across the network, wherein each said wireless signal generator is associated with a particular area within the network, wherein each said wireless signal generator produces a variable signal, the intensity of which is measured by the intrusion detection device and recorded in a database, wherein the intrusion detection device maps the intensity of each said signal with coordinates within each said particular area and said mapping is recorded in the database;
   at least a dynamically-oriented imaging device, wherein each imaging device is configured to capture an image of the particular area associated with each wireless signal generator; and
   wherein said database is configured to store the predefined criteria and the images of each particular area to enable the detection of suspicious network traffic.

2. The network security system of claim 1, wherein the intrusion detection device is further configured to periodically map the intensity of each said signal to detect changes in the physical configuration of each particular area in response to variations of said intensity.

3. The network security system of claim 1, wherein the intrusion detection device retrieves an location of said mobile device in response to the identification of a suspicious traffic.

4. The network security system of claim 3, wherein the location is retrieved based on the coordinates recorded in the database and the information provided acquire from the mobile device.

5. A wireless network security system, comprising:
   an intrusion detection device configured to intercept wireless network traffic and detect suspicious activity based on predefined criteria;
   an application software, wherein said application software comprises a first set of instructions including identifying global position satellite coordinates, a second set of instructions providing at least a first location identifier and a third set of instructions sending said global position coordinate and said location identifier to the intrusion detection device;
   a mobile device comprising a first data base and computing mechanism, wherein said application software is stored in the first data base and said set of instructions is performed by the computing mechanism;
   a plurality of wireless signal generators distributed across the network, wherein each said wireless signal generator is associated with a particular area within the network, and wherein each said wireless signal generator produces a signal, the intensity of which is continuously measured by the intrusion detection device, wherein the intrusion detection device continuously maps the intensity of each said signal with coordinates within each said particular area and said mapping is recorded in a database;
   at least a dynamically-oriented imaging device, wherein said imaging device is configured to capture an image of the particular area associated with each said wireless signal generators and said structure;
   wherein the intrusion detection device maps the physical region of said particular area with the corresponding coordinates using said dynamically-oriented imaging device and said mapping is recorded in the database; and a database configured to store the predefined criteria, the intensity of the measured signal and the images of each area to enable the detection of suspicious network traffic.

6. The wireless network security system of claim 5, wherein the predefined criteria includes global position coordinates and a list of location identifiers, wherein said list include said first location identifier.

7. The wireless network security system of claim 5, wherein the intrusion detection device retrieves an initial location of the mobile device in response to the identification of said suspicious traffic.

8. The wireless network security system of claim 7, wherein retrieving the initial location comprises identifying at least one of said wireless signal generators previously used to identify the suspicious traffic.

9. The wireless network security system of claim 7, wherein the intrusion detection device retrieves the initial location upon sampling all signal strengths from the plurality of wireless signal generators.

10. The wireless network security system of claim 7, wherein the initial location is retrieved based on the coordinates recorded in the database.

11. The wireless network security system of claim 10, wherein the dynamically-oriented imaging device is activated to capture an image of said intruder.

* * * * *